United States Patent [19]

Van Aller et al.

[11] Patent Number: 4,564,753
[45] Date of Patent: Jan. 14, 1986

[54] RADIATION DETECTOR

[75] Inventors: Gerardus Van Aller; Walter H. Kühl, both of Eindhoven, Netherlands

[73] Assignee: U.S. Philips Corporation, New York, N.Y.

[21] Appl. No.: 505,538

[22] Filed: Jun. 17, 1983

[30] Foreign Application Priority Data

Jun. 23, 1982 [NL] Netherlands ............ 8202546

[51] Int. Cl.[4] ............................................. H01J 31/50
[52] U.S. Cl. ............................... 250/213 VT; 250/207
[58] Field of Search .................. 250/213 VT, 207; 356/218, 221; 313/532, 533, 381, 382, 389

[56] References Cited

U.S. PATENT DOCUMENTS 2,534,932  6/1947  Sun ........................................ 250/207
2,553,197  5/1946  Lems ..................................... 313/533
3,280,356  7/1958  Stoudenheimer ............ 250/213 VT Primary Examiner—David C. Nelms
Assistant Examiner—J. Gatto
Attorney, Agent, or Firm—David R. Treacy; Joseph P. Abate

[57] ABSTRACT

A detector for the detection of, for example, Cerenkov radiation includes an entrance screen (5) which may cover more than half of an envelope (1); the majority of the envelope is preferably spherical. A photo-electron detecting exit screen (11) is proportioned and arranged inside the envelope (1) so that a small decay time and a high sensitivity are achieved. A scintillant exit screen (11), which is mounted on an indentation (15) in the envelope (1), can thus produce, in conjunction with a photomultiplier tube (17) mounted inside the indentation (15), a photoelectric intensification by a factor 100.

10 Claims, 1 Drawing Figure

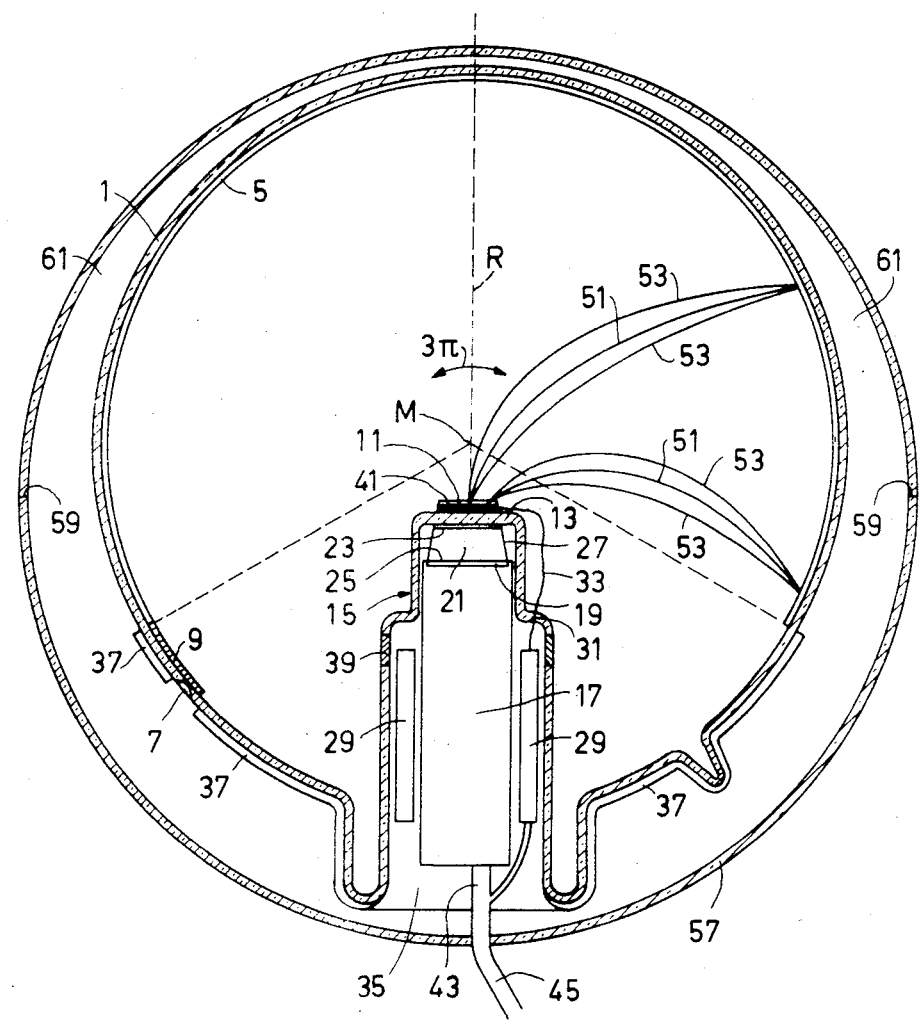

RADIATION DETECTOR

BACKGROUND OF THE INVENTION

The present invention relates to a radiation detector and, more particularly, to such a detector comprising an entrance screen which converts radiation into electrons and, accommodated in an envelope, an electron-optical system and an electron-detecting exit screen.

Detectors of this kind are known, for example, in the form of brightness intensifier tubes. The aim of brightness intensifier tubes, and more specifically image intensifier tubes, is to intensify information by converting a low-intensity entrance event into an optically faithful, high-intensity exit event. The detector has a converting function when instead of, for example, a light image an image which is carried by electro-magnetic radiation outside the visible spectral range or by corpuscular radiation is to be converted into an image which can be visually observed. The intensification of intensifying tubes is based mainly on an acceleration with, for example, from 10 to 30 kV of photo-electrons which are released in the entrance screen by incident radiation. A further brightness intensification is usually obtained by image reduction between the entrance screen and the exit screen, for example, by a factor from 10 to 50 measured in surface area. The optically faithful imaging in such tubes imposes severe specific requirements as regards the electron optical imaging system and imposes restrictions as regards the geometry of the entrance screen.

For the detection of individual photo-electrons, use could be made of a photo-multiplier tube comprising an extremely efficient photo-cathode and at least a first dynode having a high secondary emission enabling a detection within a period of about 100 nsec. The small entrance window of such tubes, however, makes it impossible to achieve a high sensitivity for these detectors.

SUMMARY OF THE INVENTION

It is an object of the invention to form a nonimaging detector having a high radiation sensitivity by using a simple electron-optical system with a short transit time for the photo-electrons and a high resolution for the detection of individual photo-electrons. To this end, a detector of the kind set forth is characterized in accordance with the invention in that a photo-cathode of the entrance screen extends within the envelope over substantially an arc of a circle of at least 180°, the exit screen being arranged inside the envelope and being proportioned so that the electron-optical system collects photo-electrons from the entire photo-cathode on the exit screen. Because the imaging function of the electron-optical system is not required in a detector embodying the invention, this system allows the photo-cathode of the entrance screen to cover a large part of the inner surface of the envelope when the position, shape and dimensions of the exit screen are suitably adapted. Moreover, for the photo-electrons, an extremely short transit time can be achieved with customary potential differences between the entrance screen and the exit screen.

Viewed from the center of a substantially spherical envelope, the entrance screen in a preferred embodiment covers a solid angle of approximately $3\pi$. The exit screen is then symmetrically arranged around a radius of the sphere at from $\frac{1}{4}$ to $\frac{1}{3}$ of the radius, taken from the center. A photo-cathode acts as the entrance screen and the exit screen is made of a scintillant material. The exit screen is mounted, for example, on an indentation in the envelope, said indentation accommodating a conventional photomultiplier tube for the detection of photons released in the exit screen.

The exit screen in a further preferred embodiment comprises a semiconductor electron detector which is connected, for example, directly to a preamplifier.

For a suitable and efficient optical coupling between an exit screen made of scintillant material and a photomultiplier tube to be coupled thereto, use can be made of an optical fiber plate. Use can alternatively be made of a conical light conductor having a comparatively small end face which faces the exit screen and a comparatively large end face which faces the photomultiplier tube. Preferably, transitions between separate parts of the optical coupling are filled with an immersion oil which is adapted to the refractive indices of the parts; alternatively, these parts can be cemented together by means of a suitable means, for example, Canada balsam.

In order to increase the selectivity of the detection, the exit screen is preferably made of a scintillant material having a short decay time. Read-out electronics can then be adapted to the excitation response curve of the phosphor, so that a relevant characteristic property of the scintillant material is dedicated to the detection. Detection also can be carried out with a semi-conductor wafer having a p-n junction for a direct detection of electrons.

BRIEF DESCRIPTION OF THE DRAWING

Some preferred embodiments of the invention will be described in detail hereinafter with reference to the sole drawing.

DESCRIPTION OF THE PREFERRED EMBODIMENTS

The combination formed by a photo-cathode entrance screen, a scintillant exit screen and a photomultiplier tube which is suitably coupled and adapted thereto is capable of converting a single photo-electron from the entrance screen of the detector into, for example, from 10 to 100 photo-electrons in the photomultiplier tube.

The single FIGURE shows an envelope 1 of a detector embodying the invention. The majority of the envelope is substantially spherical and forms a sphere having a center M. On an inner surface of the spherical portion, there is provided a radiation electron converting entrance screen 5 which extends through a solid angle of up to, for example, $3\pi$. The entrance screen is, in this case, formed by a photo-cathode to which a potential source can be connected via an electrical lead-through 7 and an electrically conductive strip 9 on the inner surface of the spherical portion. In such an embodiment comprising an entrance screen in the form of a photo-cathode, the envelope will be transparent, of course, for the photons to be detected. To this end, the sphere is made of glass. The entrance screen may, alternatively, be made of a phosphor and use can be made of a photo-cathode, for example, of the type used in an X-ray image intensifier tube. In that case, the envelope is transparent and the phosphor layer is susceptible to the radiation to be detected, for example, ultraviolet radiation, corpuscular radiation or X-rays, and converts this radiation into photons for which the photo-cathode is susceptible; the envelope may be made of a material other than glass. Using a glass envelope, the phosphor screen may also be provided on an outer surface of the envelope in this embodiment. The latter is permissible because imaging requirements need not be imposed. An entrance screen may be provided directly on the inner wall of the envelope, but may alternatively be mounted in the vicinity thereof as a self-supporting screen.

The detector of a specific embodiment comprises a photo-cathode entrance screen which is optimally sensitive for the detection of Cerenkov radiation, that is to say photons in the near ultraviolet or shortwave blue part of the spectrum with, for example, a wavelength of 400 μm, but the sensitivity also holds for radiation with a wavelength of approximately 60 μm. Therefore, a phosphor containing yttrium oxide is applicable.

An electron detecting exit screen 11 is symmetrically arranged with respect to a radius R of the spherical portion of the envelope which forms a spatial bisector of the solid angle subtended at the center M by the entrance screen. The exit screen 11 in the embodiment shown is mounted on an end wall portion 13 of an indentation 15 in the envelope. For a radius R of the spherical portion of, for example, 170 mm, the exit screen is situated at a distance of, for example, from 40 to 60 mm from the center M. For suitable optical coupling between a photomultiplier tube 17 mounted in the indentation and the exit screen, a conical light conductor 21 is arranged between the wall portion 13 and an entrance window 19 of the photomultiplier tube. A smaller end face 23 as well as a larger end face 25 of the light conductor can be coupled to the oppositely situated glass windows by way of a suitable immersion oil or cement.

A surface 27 of the cone may be formed so as to be internally light reflective, for example, by polishing. The indentation comprises a widened portion so that space is created for the mounting of a power supply source 29, for example, a high voltage generator for the various dynodes of the photomultiplier and, for example, also for a high voltage of, for example, 25 kV for the exit screen. The exit screen voltage is applied to the exit screen via a lead-through 31 in a shoulder portion between the wider and narrower portions of the indentation and an internal conductor 33. The remaining space in the indentation 15 is filled with an electric insulator 35, for example, rubber. In order to prevent potential light phenomena by the high voltage which light could penetrate the envelope, at least a part of the outer wall of the envelope which is not co-extensive with the entrance screen is covered with an electrically conductive layer 37. If the detector is to be used for the detection of photons from all directions, the layer 37 is constructed to be transparent for these photons. Photons can then enter the envelope from the rear and can then as yet release, after passing across the envelope, photo-electrons in the photo-cathode. In order to prevent photons generated in the exit screen from reaching the photo-cathode of the entrance screen, an optical interruption 39 is formed in the wall of the indentation and the exit screen is provided on its inner side with a shield 41 which is transparent for the 25 kV electrons but which is optically non-transparent.

The power supply source is connected to the photomultiplier tube via electric conductors 43; electric conductors 45 also serve for the signal output.

Actually, the electron-optical system is now formed only by the photo-cathode which is maintained approximately at zero potential, and by the exit screen which is maintained at, for example, 25 kV. For two locations on the photo-cathode, the drawing shows electron paths 51 calculated for photo-electrons emerging perpendicularly from the photo-cathode and electron paths 53 calculated for photo-electrons emerging at an angle of 45° from the photo-cathode.

A detector embodying the invention is particularly suitable for use in a detection system for neutrinos and muons which are to be detected for astronomical studies. The interaction between neutrinos and matter is extremely small and it is necessary to avoid disturbing radiation in the detector system, for example, by performing the measurements in water at a great depth. The Cerenkov radiation generated by the neutrinos and muons can then be measured by means of a three-dimensional detector matrix. More information on this detection method is given in an article by Learned and Eichler in *Scientific American*, February 1981, pages 104–113.

For this purpose, the detector shown in the drawing may be accommodated in a preferably spherical pressure vessel 57. For this detector, the pressure vessel need not be much larger than the spherical envelope 1 of the detector. The pressure vessel consists of, for example, two hemi-spheres which are assembled to form one unit by way of a connection 59. The space 61 between the pressure vessel and the entrance screen may be filled with an immersion oil for optical coupling.

What is claimed is:

1. A radiation detector, comprising:
   an envelope;
   an entrance screen for converting radiation outside the envelope into electrons inside the envelope, the entrance screen comprising a photocathode which extends within the envelope over substantially a solid angle of at least 180°, and
   an electron-detecting exit screen for collecting the electrons from the entrance screen, the exit screen being proportioned and arranged such that the exit screen collects photoelectrons from the entire photocathode.

2. A radiation detector as claimed in claim 1, wherein a majority of the envelope includes a substantially spherical part made of a material transparent for radiation to be detected and a remainder part with an indentation, and wherein the exit screen includes a scintillant material, the exit screen being mounted on an end face of the indentation, and the detector further comprising a photomultiplier tube mounted in the indentation.

3. A radiation detector as claimed in claim 2, wherein the entrance screen, the exit screen and the photomultiplier tube are proportioned and arranged such that each photoelectron released by the entrance screen is converted into approximately 10 to 100 photoelectrons in the photomultiplier tube within a period of not greater than 100 nanoseconds.

4. A radiation detector as claimed in claim 2 or 3, further comprising a fiber-optical window for optically coupling the photomultiplier tube to the exit screen, the fiber-optical window being optically coupled between the exit screen and the photomultiplier tube.

5. A radiation detector as claimed in claim 2 or 3, further comprising a conical light conductor for optically coupling the exit screen to the photomultiplier tube, the conical light conductor being optically coupled between the exit screen and the photomultiplier tube.

6. A radiation detector as claimed in claim 1, wherein the exit screen includes a wafer formed of a semiconductor material having a p-n junction.

7. A radiation detector as claimed in claim 1, 2, 3 or 6 wherein the entrance screen includes a layer of a luminescent material provided on an outer side of the envelope, the luminescent material being provided such that the luminescent layer is coextensive with the photocathode.

8. A radiation detector as claimed in claim 2 or 3, wherein the exit screen is arranged symmetrically with respect to a radius of the spherical portion of the envelope, the exit screen being further arranged at a distance of from approximately one-fourth to approximately one-third of the radius from the center of the spherical portion.

9. A radiation detector as claimed in claim 3, wherein the exit screen comprises a scintillant material including yttrium oxide.

10. A radiation detector as claimed in claim 1, 2, 3 or 9, further comprising a spherical pressure vessel which is slightly larger than the envelope, the envelope being accommodated within the spherical pressure vessel.

* * * * *